United States Patent [19]

Garrett et al.

[11] Patent Number: 5,086,101

[45] Date of Patent: Feb. 4, 1992

[54] GLASS SIZE COMPOSITIONS AND GLASS FIBERS COATED THEREWITH

[75] Inventors: David W. Garrett, Marietta, Ga.; Robert A. Schweizer, Granville, Ohio

[73] Assignee: Owens-Corning Fiberglas Corporation, Toledo, Ohio

[21] Appl. No.: 552,050

[22] Filed: Jul. 13, 1990

[51] Int. Cl.$^5$ .................. C08J 5/10; C08K 5/15; C08K 5/24; B32B 9/00

[52] U.S. Cl. .................... 524/188; 524/114; 524/262; 524/263; 524/264; 428/391

[58] Field of Search ............... 524/114, 188, 262, 263, 524/264; 428/391

[56] References Cited

U.S. PATENT DOCUMENTS

| | | |
|---|---|---|
| 3,962,174 | 6/1976 | Berardinelli . |
| 4,039,716 | 8/1977 | Johnson . |
| 4,608,304 | 8/1986 | Rosthauser . |
| 4,625,007 | 11/1986 | Ellis et al. .............. 528/32 |
| 4,711,924 | 12/1987 | Salensky . |
| 4,745,028 | 5/1988 | Das et al. . |
| 4,808,478 | 2/1989 | Dana et al. . |
| 4,990,549 | 2/1991 | Delvin et al. ........... 523/214 |

*Primary Examiner*—Paul R. Michl
*Assistant Examiner*—Patrick Niland
*Attorney, Agent, or Firm*—Patrick P. Pacella; Catherine B. Martineau

[57] ABSTRACT

An aqueous glass size composition comprising a water dispersible phenoxy resin modified with an acid, cyanurate or isocyanurate, and an organosilane coupling agent is disclosed. The glass fibers coated with the aqueous size composition are useful for incorporation into molding compositions for strength improvement.

15 Claims, No Drawings

GLASS SIZE COMPOSITIONS AND GLASS FIBERS COATED THEREWITH

TECHNICAL FIELD

This invention relates to a size composition and to glass fibers at least partially coated therewith which are useful for incorporation in molding of compositions for strength improvement.

BACKGROUND OF THE INVENTION

The use of molding compositions, both sheet and bulk, is well known. Generally such molding compositions comprise a thermoplastic polyester resin and various fillers and reinforcements in combination with a crosslinking agent. However, various thermoplastic polyester resins as polyethylene terephthalate (PET), (1,4-polybutylene terephthalate) (PBT), poly(1,4-chclohexane dimethanol terephthalate) (PCT) mixtures thereof and the like have not previously been found to be especially suitable for use as molding resins due to their brittleness when molded in thick sections. The resulting molding compositions often lack the desired physical strength characteristics.

It is customary to incorporate into the molding compounds various fillers and reinforcements which provide bulk and strength. Principal among such reinforcements are glass fibers which generally have diameters of about 0.0025 to 0.0075 inch and lengths of about 0.13 to about 2.00 inch. In order to facilitate the handling of the glass fibers, it is customary that they be sized immediately upon forming. It is advantageous if the size composition serves not only to facilitate the handling of the glass fibers but also if the size acts to create a bond between the glass fibers and the resin such that the strength properties of the molded resin are improved. The glass size composition of this invention possesses such properties.

DISCLOSURE OF THE INVENTION

According to this invention, there is provided a glass size composition which comprises a water dispersible phenoxy resin, a di- or tri-functional cyanurate or isocyanurate, and an organosilane coupling agent. Optionally, the size can further comprise a crosslinking agent and a nonionic lubricant. Preferably, the water dispersible phenoxy resin comprises a carboxyl modified polyhydroxy ether. The preferred di- or tri-functional cyanurate or isocyanurate is triglycidyl isocyanurate.

This invention also provides a molding composition containing glass fibers sized with the size of this invention.

Also according to this invention, there are provided glass fibers, at least a portion of the surface of which is sized with the size of this invention.

Description of the Preferred Embodiments

The glass size composition of the present invention, is useful with filamentous glass which is well-known to those skilled in the art. Various types of glass filaments, such as "E" glass and other known types of glass, can be sized with the size of the present invention. The size of the present invention is useful on glass filaments having a wide range of diameters, and can be used on glass filaments whether or not they are gathered into fibers, ropes, rovings, yarns and the like.

In the aqueous size composition of this invention any suitable water dispersible phenoxy resin modified with an acid, such as carboxylic acid can be employed. For example, the water dispersible phenoxy resin can comprise a carboxyl modified polyhydroxy ether. The acid modified phenoxy resins, preferably modified with carboxylic acid, are described in Salensky, U.S. Pat. No. 4,711,924. One particularly suitable water dispersible phenoxy resin is PKHW-35 commercially available from Union Carbide. The water dispersible phenoxy resin will be employed in the size in an amount within the range of from about 1 to about 10 weight percent of the aqueous size.

In the size composition of this invention any suitable di- or tri-functional cyanurate or isocyanurate can be employed, such as cyanurate or isocyanurate known as TEPIC, commercially available from Nippon Chemical. Another suitable triglycidyl isocyanurate is Araldite PT810, commerically available from Ciba Geigy. The cyanurate or isocyanurate will be employed in the size in an amount within the range of from about 1 to about 10 weight percent of the aqueous size.

Any suitable coupling agent comprising an organosilane, or a mixture thereof, can be employed. Preferably, an organo-silane such as gammaglycidoxypropyltrimethoxysilane will be used. A suitable coupling agent of this type is available as A-187 from Union Carbide. Other suitable coupling agents include, for example, gamma-methacryloxypropyltrimethoxysilane, available as A-174 from Union Carbide, diaminopropyltrimethoxysilane, and gammaaminopropyltriethoxysilane available as A-1100 from Union Carbide. The coupling agent is employed in the size in an amount within the range of from about 0.01 to about 2.0 weight percent. The glass size composition of this invention can also comprise up to 0.06 weight percent of an acid suitable to adjust the pH of the size composition to enable silane hydrolysis prior to the addition of the silane coupling agent. A suitable acid is glacial acetic acid.

The glass size composition of this invention preferably also comprise at least one nonionic lubricant and at least one crosslinking agent.

Any suitable crosslinking agent can be used. Particularly suitable crosslinking agents include etherated diphenols such as an ethoxylated bisphenol A, available from the Ethox Corporation. The crosslinking agent will be employed in the size in an amount within the range of from about 0.05 to about 5 weight percent.

Any suitable nonionic lubricant can be employed. A preferred lubricant is polyethylene glycol having a molecular weight of about 400, available from Emery Industries. Other suitable nonionic lubricants are ethoxylated fatty acids or di-acids, an ethoxylated nonylphenol, and an ethoxylated octylphenol. The lubricant is employed in the size in an amount within the range of from about 0.02 to about 2.0 weight percent.

A preferred embodiment of the size of this invention comprises, by weight percent, approximately:

| | |
|---|---|
| water dispersible phenoxy resin | 3.0 wt % |
| triglycidyl isocyanuate | 3.0 wt % |
| silane coupling agent | 1.0 wt % |
| crosslinking agent | 0.5 wt % |
| nonionic lubricant | 0.2 wt % |
| acetic acid | 0.02 wt % |
| demineralized water | balance |

The size of this invention is prepared by a method such as that described below. It can be applied to any glass fibers conventionally employed as molding compound reinforcement, being applied during the forming operation such that the fibers possess, upon drying, a solids content within the range of from about 0.5 to about 2.0 weight percent.

The best mode for carrying out the invention is demonstrated by the following examples.

EXAMPLE I

This example demonstrates the preparation of approximately 100 gallons of a size composition of this invention.

About 15 gallons of demineralized water, at a temperature of about 75°+/−5° F., were introduced into a main mix tank and agitated. About 20 gallons of demineralized water were introduced into a first premix kettle and agitated. The water in the first premix kettle was heated to about 170° F. and about 23.57 pounds of triglycidyl isocyanurate were slowly added thereto. The composite was mixed until the solution became clear and thereafter added to the main mix tank.

About 25 gallons of demineralized water were introduced into a second premix kettle and agitated. About 0.17 pounds of glacial acetic acid were added. About 7.88 pounds of gamma-glycidoxypropyltrimethoxy silane (Union Carbide A-187) were added thereto at a rate of about 1 pound/minute and stirred for 15 minutes. Thereafter, the composite was added to the main mix tank.

About 15 gallons of demineralized water were introduced into a third premix kettle and agitated. About 62.9 pounds of a water dispersible phenoxy resin (Union Carbide PKHW-35) were added thereto. About 1.33 pounds of polyethylene glycol (Emery PEG 400 MO) were added thereto. About 3.90 pounds of polyoxyethane (6) bisphenol A (Ethox) were added thereto. The composite was mixed for about 15 minutes and added to the main mix tank.

The contents of the main mix tank, after complete mixing for at least 15 minutes and the addition of sufficient water to bring the volume of the size to about 100 gallons, will have a solids content within the range of from about 7 to about 8 weight percent and a pH within the range of from about 4 to 6.

The size prepared in the above manner once cooled to about a storage temperature of about 70°-90° F., and constantly slowly agitated may be applied to glass fibers within a time period of about 72 hours after preparation.

The size prepared in the above manner was applied to individual glass fibers by conventional application methods and at rates such that the strand solids, on drying, amounted to about 2 weight percent. Preferably, the size is supplied to the applicator at a temperature of about 50°-60° F.

EXAMPLE II

Glass fibers comprising standard length chopped glass fibers have an average length of about 0.125 inches and from about 0.00035–0.00039 inch fiber diameter were sized on forming with the size listed in Table I below.

TABLE I

| | Glass Fiber Size Formulation | | | |
|---|---|---|---|---|
| Component | Example 1 wt % | Example 2 wt % | Example 3 wt % | Example 4 wt % |
| PKHW-35 | 12.9 | | 8.0 | 12.2 |
| TGIC | | 6.5 | 3.0 | 1.5 |
| A-187 | 0.96 | | 1.0 | 1.0 |
| A-1100 | | 1.0 | | |
| PEG 400 MO | 0.12 | 0.15 | 0.2 | 0.2 |
| POE (6) BPA | | | 1.0 | 1.0 |
| Acetic acid | 0.02 | 0.6 | 0.05 | 0.05 |
| D. M. water | rest | rest | rest | rest |

The various size formulations listed above as Examples 1, 2, 3 and 4 were used to size glass fibers having average length of about 0.125 inch and the molded mechanical properties of the sized fibers were evaluated and compared to a commercially available sample. The results of each test are shown in Table II below.

TABLE II

| | | | Molded Mechanical Properties of Polybutylene Terephthalate Reinforced with Treated Fibers | | | | | |
|---|---|---|---|---|---|---|---|---|
| | | | | | | | Impact Strength | |
| Glass Fiber Sample | strand solids (%) | glass content (%) | tensile stress (ksi) | tensile modulus (gsi) | flexural stress (ksi) | flexural modulus (gsi) | notched izod (ft-lb/in) | unnotched izod (ft-lb/in) |
| Example #1 | .67 | 30 | 21.0 | 1.28 | | | 2.04 | 17.8 |
| | .78 | 30 | 20.2 | 1.27 | | | 2.11 | 17.4 |
| Example #2 | .61 | 30 | 23.0 | 1.31 | | | 2.43 | 20.4 |
| | .43 | 30 | 22.4 | 1.33 | 33.4 | 1.29 | 2.42 | 20.6 |
| Example #3 | .60 | 30 | 21.9 | 1.46 | | | 2.26 | 19.8 |
| Example #4 | .77 | 30 | 20.6 | 1.46 | | | 2.08 | 18.2 |
| Commercial Example | .90 | 29 | 20.8 | 1.28 | | | 2.09 | 16.9 |
| | .65 | 30 | 21.0 | 1.31 | 31.2 | 1.29 | 2.13 | 17.4 |

It will be seen from the above data that glass sized with the size of the present invention compare favorably with the commercially available sample and have greater mechanical strength than the prior art sample.

It will be evident from the foregoing that various modifications can be made to the present invention. Such, however, are considered as being within the scope of the invention.

We claim:

1. An glass aqueous size composition comprising a water dispersible phenoxy resin modified with an acid, a di- or tri-functional cyanurate or isocyanurate, and an organosilane coupling agent.

2. The composition of claim 1, wherein the water dispersible phenoxy resin consists essentially of a carboxyl modified polyhydroxy ether.

3. The composition of claim 1, wherein the di- or tri-functional cyanurate or isocyanurate consists essentially of triglycidyl isocyanurate.

4. The composition of claim 1, wherein the organosilane coupling agent is selected from the group consisting essentially of gamma-glycidoxypropyltrimethoxysilane, gamma-methacryloxypropyltrimethoxysilane, gamma-aminopropyltriethoxysilane or a mixture of any of the foregoing.

5. The composition of claim 1, wherein the organosilane coupling agent consists essentially of gamma-glycidoxypropyltrimethoxylsilane.

6. The composition of claim 1, wherein the water dispersible phenoxy resin comprises about 1 to about 10 weight percent; the di- or tri-functional cyanurate or isocyanurate comprises about 1 to about 10 weight percent; and, organosilane coupling agent comprises about 0.01 to about 20 weight percent, based on the total weight of the aqueous size composition.

7. The composition of claim 1 further comprising a crosslinking agent.

8. The composition of claim 7 wherein the crosslinking agent comprises an etherated diphenol.

9. The composition of claim 7, wherein the etherated diphenol crosslinking agent consists essentially of a polyoxyethane (6) bisphenol A.

10. The composition of claim 7, wherein the etherated diphenol crosslinking agent comprises about 0.05 to about 5 weight percent, based on the total weight of the aqueous size composition.

11. The composition of claim 1 further comprising a nonionic lubricant.

12. The composition of claim 11, wherein the nonionic lubricant consists essentially of polyethylene glycol having a molecular weight of about 400.

13. The composition of claim 11, wherein the nonionic lubricant comprises about 0.02 to about 2 weight percent, based on the total weight of the aqueous size composition.

14. A glass fiber sized with the dried residue of an aqueous size composition comprising a water dispersible phenoxy resin modified with an acid, a di- or tri-functional cyanurate or isocyanurate, and an organosilane coupling agent.

15. The glass fiber of claim 14, wherein the size composition comprises about 0.5 to about 2.0 percent of the weight of the glass.

* * * * *